US005637987A

United States Patent [19]
Fattic et al.

[11] Patent Number: 5,637,987
[45] Date of Patent: Jun. 10, 1997

[54] REGENERATIVE VEHICLE LAUNCH

[75] Inventors: Gerald T. Fattic; Daniel W. Stahura, both of Anderson, Ind.; William J. Vukovich, Ypsilanti, Mich.

[73] Assignee: General Motors Corporation, Detroit, Mich.

[21] Appl. No.: 573,685

[22] Filed: Dec. 18, 1995

[51] Int. Cl.$^6$ ........................................... H02P 15/00
[52] U.S. Cl. ........................ 322/40; 322/11; 322/13; 290/19; 290/21; 180/65.3
[58] Field of Search ............................. 322/11, 12, 13, 322/14, 16, 40; 180/65.3, 65.5; 290/19; 477/3

[56] References Cited

U.S. PATENT DOCUMENTS

| | | | |
|---|---|---|---|
| 4,883,973 | 11/1989 | Lakey et al. | 290/31 |
| 5,258,651 | 11/1993 | Sherman | 290/23 |
| 5,285,111 | 2/1994 | Sherman | 290/4 C |
| 5,433,282 | 7/1995 | Moroto et al. | 180/65.2 |
| 5,496,227 | 3/1996 | Minowa et al. | 477/62 |
| 5,558,175 | 9/1996 | Sherman | 180/65.2 |
| 5,558,589 | 9/1996 | Schmidt | 475/5 |
| 5,558,595 | 9/1996 | Schmidt et al. | 477/3 |
| 5,562,565 | 10/1996 | Moroto et al. | 477/3 |
| 5,571,058 | 11/1996 | Schmidt | 475/5 |

*Primary Examiner*—Steven L. Stephan
*Assistant Examiner*—Nicholas Ponomarenko
*Attorney, Agent, or Firm*—Vincent A. Cichosz

[57] ABSTRACT

A hybrid electric vehicle includes an internal combustion engine, a multi-speed automatic transmission, and an electric machine operable in a motoring mode and a generating mode. A compound planetary gear set operatively couples the engine, transmission and electric machine. The electric machine is operable during periods of vehicle launch to provide a reaction torque for the planetary gearset such that torque is supplied to the input of the transmission and the reaction torque energy is converted to electrical energy for storage in a vehicle battery pack battery. The method employs a combination of open loop torque control and closed loop speed controls responsive to rotational parameters of the vehicle drivetrain including engine speed, electric machine rotor speed and transmission input speed to control the generator torque of the electric machine to thereby produce the reaction torque for accelerating the vehicle and for producing electrical power during the vehicle launch.

12 Claims, 4 Drawing Sheets

REGENERATIVE VEHICLE LAUNCH

BACKGROUND

Generally, the present invention is related to vehicles having an internal combustion engine and a rotary electric machine operatively coupled through a gear set to an output shaft. The output shaft in turn is operatively coupled to a final drive through a multi-ratio transmission. Such arrangements are known having various operating modes through which torque transfers between and among the engine, the electric machine, and the output shaft are controllable to effectuate desired operational objectives.

It has been recognized that certain preferred compound planetary gear set arrangements hold promising potential for such diverse operating modes, among them being vehicle drive modes wherein positive torque is produced at the drive wheels to propel the vehicle. Such drive modes may be characterized by a positive engine torque and a positive electric machine torque wherein the electric machine contributes motoring or inertial torque, or by a positive engine torque and a negative electric machine torque wherein the electric machine diverts a generating torque. The present invention is directed toward a vehicle drive mode of the latter variety specifically during vehicle launch wherein the vehicle is accelerated from a substantially static condition.

SUMMARY

Therefore, it is a primary object of the present invention to control the operation of the electric machine to provide for the desired vehicle launch characteristics and generated electrical power.

A method of launching a vehicle from a substantially static condition is disclosed for a hybrid internal combustion engine and electric machine vehicle. The vehicle has a drivetrain comprising an internal combustion engine including an engine output member, an electric machine including a stator and rotor, and a gear set operatively coupling the internal combustion engine output, the rotor and a gear set output member. The gear set output member is coupled to the input member of a multi-speed automatic transmission to impart torque to one or more drivewheels of the vehicle. The electric machine is effective as an electric brake reaction element to control torque transfer between said engine output member and the gear set output member.

The control is effective to detect a predetermined set of vehicle drivetrain operating parameters, for example engine speed, rotor speed and transmission input speed. These parameters are used to control the generator torque of the electric machine to thereby produce a reaction torque for accelerating the vehicle and for producing electrical power during the vehicle launch. After substantial convergence of the rotor and gear set output speeds, the control provides for speed tracking of the rotor to the gear set output.

The vehicle drivetrain preferably includes a selectably engageable friction device for directly coupling the gear set output to the rotor, the engagement of which is caused to occur while controlling the rotor speed to the gear set output speed.

Furthermore, the drivetrain preferably includes a selectably engageable friction device for directly coupling the gear set output member to the engine output, the engagement of which is also caused to occur while controlling the rotor speed to the gear set output speed.

BRIEF DESCRIPTION OF THE DRAWINGS

The present invention will now be described, by way of example, with reference to the accompanying drawings, in which.

DETAILED DESCRIPTION

Figure 1:
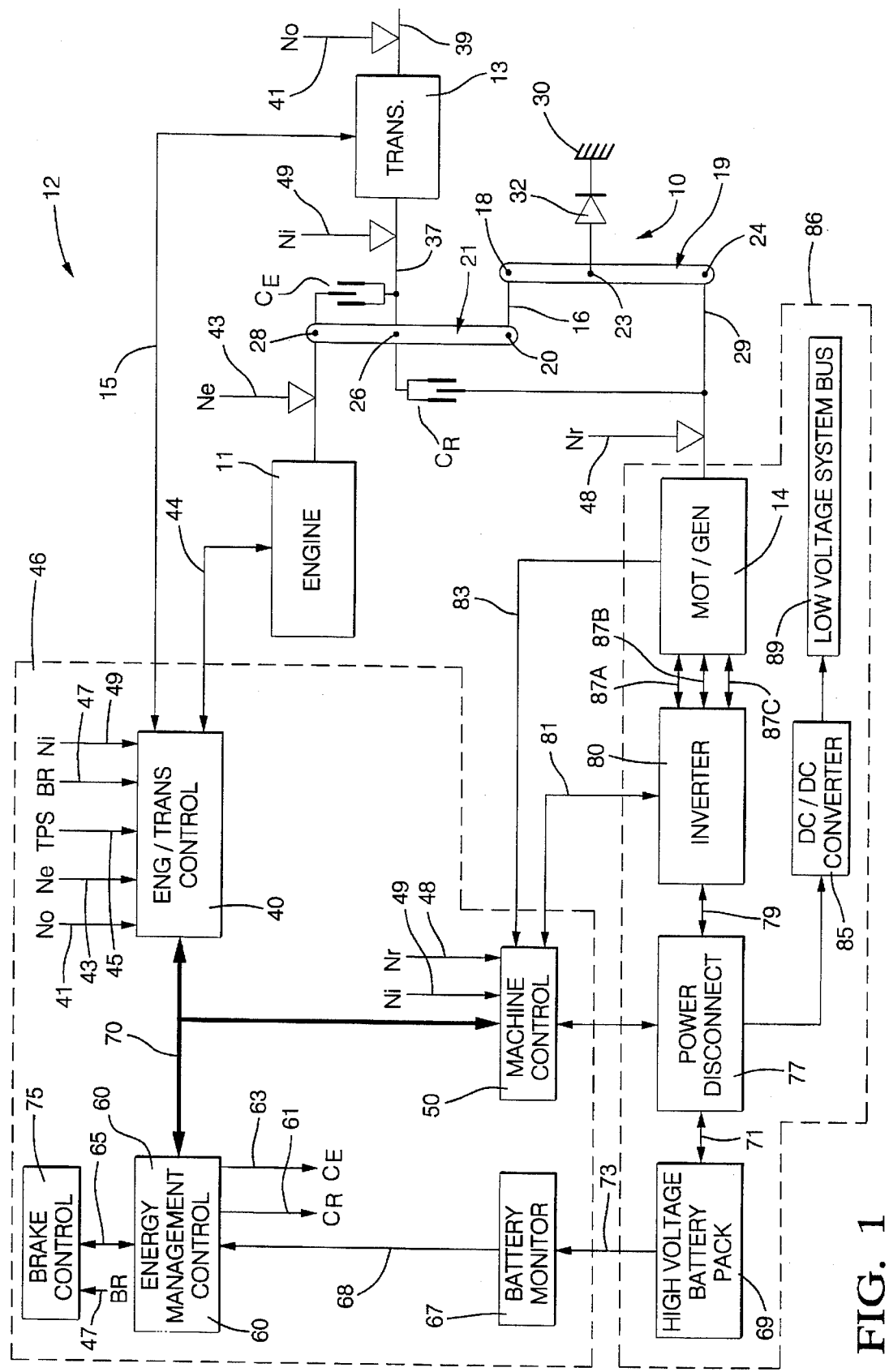
FIG. 1 illustrates in block diagram format a microcomputer based control system for carrying out the control of the present invention in conjunction with an exemplary gear set as illustrated in lever analogy format.

With reference first to FIG. 1, portions of a hybrid internal combustion/electric vehicle drivetrain and micro-computer based control system therefor is generally labeled 12. A control section of the system is generally labeled 46 in the figure, while an electrical power section is generally labeled 86. A vehicle drivetrain includes a conventional internal combustion engine 11, electric propulsion motor/generator 14 (hereafter electric machine) and multiple speed ratio transmission 13. Transmission is adapted to receive input torque at input member and transmit output torque to an output shaft 39 through one or more fluid operated friction devices (not shown) which are applied or released in accordance with a predetermined schedule for establishing a desired transmission speed ratio. A gear set generally labeled 10 in the figure operatively couples the internal combustion engine output shaft, the electric machine rotor shaft, and transmission input member. The gear set 10 in the present embodiment is a compound planetary gear set having a common connecting gear 16 serving as a ring gear in one planetary gear set 19 and as a sun gear in a second planetary gear set 21. With reference to the first planetary gear set 19, the sun gear 24 is permanently connected to the rotor shaft as represented by line 29. The carrier 23 for a respective first plurality of planetary gears (not shown) of gear set 19 is coupled through one way device 32 to ground 30. The radially inner surface of connecting gear 16 has a plurality of teeth 18 comprising the ring gear of gear set 19. The first plurality of planetary gears, of course, meshingly engage the sun gear 24 and teeth 18 of connecting gear 16.

The radially outer surface of connecting gear 16 also has a plurality of teeth 20 allowing it to serve as the sun gear of gear set 21. With reference to the second gear set 21, a ring gear 18 is permanently coupled to the output shaft of internal combustion engine 11 as represented by line 27. Carrier 26 is connected to a second plurality of planetary gears (not show) of the second gear set 21 and is selectively connectable to the rotor of electric machine 14 through a friction device, hereafter clutch $C_E$. The carrier 26 is also selectively connectable to the ring gear 28 of the second planetary gear set 21 through a friction device, hereafter clutch $C_E$. The second plurality of planetary gears, of course, meshingly engage the teeth 20 of connecting gear 16 and the ring gear 28. The carder 26 is also permanently coupled to the transmission input member as represented by line 37. A more detailed description of such an exemplary compound gear set 10 may be found in U.S. Pat. No. 5,285,111 also assigned to the assignee hereof.

An oil pump (not shown) provides hydraulic fluid under pressure for lubrication and cooling, and also for actuation of clutches $C_R$ and $C_E$ in a conventional manner. For example, the engine output member drives a mechanical oil pump for providing the transmission 13 and gear set 10 with working fluid pressure. Such hydraulic systems are well known to those skilled in the art. Each clutch $C_R$ and $C_E$ has associated therewith a respective control chamber in which the fluid pressure is controlled by a respective fluid control valve. The fluid control valve is preferably a pulse width modulated solenoid valve. Such clutch control hardware is also well known to those skilled in the art.

Engine 11 includes a conventional throttle mechanism (not shown) connected to an accelerator pedal (not shown) for regulating the air intake of the engine. The engine is fueled by a conventional method in relation to the air intake to produce output torque at the output member in proportion thereto.

With reference to section 46, the general control section thereof comprises engine and transmission controller 40 for providing conventional engine control functions and transmission control functions, electric machine controller 50 for providing motoring torque and regenerative torque control, and energy management controller 60 for providing control and coordination of gear set 10 clutches and motoring and regenerative torque. Brake controller 75 provides for control and monitoring of hydraulic vehicle brakes (not illustrated) including individual wheel speed sensing and hydraulic actuated anti-lock functions. Additionally, the brake controller functions to request regenerative braking visa-vis controlled generator torque. All controllers listed are microcomputer based constructed from such conventional elements as microprocessors, memory including ROM and RAM, I/O including A/D and D/A, ALU, and high speed clocks, and are suited for the particular control functions which they individually and cooperatively perform. Bi-directional serial data link 70 provides for communication between the various controllers 40, 60, and 50. The brake controller 75 communicates only with and through energy management controller 60 via dedicated lines represented in the aggregate by line 65 for fast data transfer required for cooperative hydraulic/regenerative brake control.

Engine control functions carried out in response to various sensed engine operating parameters such as air ingestion, coolant temperature and exhaust gas constituents include engine spark timing control, idle speed control, fuel control, etc., which are effected in accordance with various control signals. Similarly, transmission control functions carried out in response to various sensed transmission operating parameters such as fluid temperature include line pressure regulation and individual clutch apply/release controls, which are effected in accordance with various control signals. The various sensed parameters for carrying out the engine and transmission control functions, but not individually utilized by the control of the present invention, as well as the various control signals to the engine and transmission are generally represented in the aggregate by lines 44 and 15 for the engine and transmission, respectively. Certain sensed parameters particularly relevant to the present control are illustrated as individual inputs to the engine and transmission controller 40 and include: transmission output speed (No), line 41; engine output speed (Ne), line 43; throttle position (TPS), line 45; service brake switch (BR), line 47; and transmission input shaft speed (Ni), line 49.

Energy management control functions are carried out in response to various vehicle parameters such as transmission output member speed Ni, electric machine rotor speed Nr, Engine output speed Ne, vehicle speed (Nv), brakes actuation BR, and state of charge and temperature of the battery pack. Specific vehicle parameters used by the energy management controller 60 are provided thereto over serial data link 70 from conditioned inputs at the engine and transmission controller 40 and machine controller 50. Additionally, braking data from brake controller 75 is supplied over dedicated data lines as previously mentioned. Battery pack energy requirements are provided by a battery monitor 67 over data line 68. Particularly relevant to the control functions performed by the energy management controller 60 in carrying out the present invention are the speed quantities Ni, Ne, No, Nr and Nv, and throttle position TPS. Energy management controller 60 provides a torque request over the serial data link 70 to the machine controller 50 for execution thereby. Lines 61 and 63 provide pulse width modulated control signals to respective solenoid controlled fluid valves (not shown) to thereby provide controlled fluid pressure to control chambers of clutches $C_R$ and $C_E$, respectively, of gear set 10.

Machine controller 50 is essentially a slave unit to operational requests from energy management controller 60 over serial data link 70. A separate input for transmission input member speed Ni on line 49 provides real time data for the machine controller 50 for back-up energy management functions in the event that energy management controller 60 control is somehow displaced. Additionally, electric machine rotor speed Nr on line 48 is input to the controller as is a electric machine temperature signal on line 83. Machine controller is interfaced with inverter 80 for supplying thereto the desired inverter operation to effectuate the desired electric machine operation. At least one of the plurality of stator phase currents is sensed to provide data to machine controller 50. Current sense and inverter control signals are represented by line 81 in the figure. Operational requests over the serial data link 70 encompass, essentially, torque magnitude and direction and hereafter may be symbolized by the shorthand designation Tq. Machine controller preferably operates by processing the request in accordance with real time electric machine speed data Nr to control torque influencing electric machine parameters. For example, in the present exemplary embodiment having an AC induction machine, controlled parameters may include stator field current, slip speed and direction. Machine controller preferably derives desired control signals in the form of pulse width modulated gating signals for application to inverter 80 to generate the desired field waveforms through table look-ups of pre-stored data. An exemplary control is described in U.S. Pat. No. 4,883,973 also assigned to the assignee of the present invention.

With reference now to the electrical power section 86 of FIG. 1, electric machine 14 receives stator phase motoring currents and provides stator phase generating currents through inverter 80 over lines 87a, 87b, and 87c. Inverter 80 is coupled to a high voltage battery pack 69 through a power disconnect device 77 and bi-directional high voltage bus lines 71 and 79. Device 77 is monitored by and is responsive to machine controller 50 to prevent undesirable overcurrent conditions. DC to DC converter 85 is also connected through disconnect device 77 to battery pack 69 and provides a low voltage power source, for example 12 volt, to a system bus 89 for operating conventional vehicle electrical loads (not shown). Battery pack is monitored as shown by line 73 for such parameters as temperature, voltage and current draw therefrom or supply thereto by battery monitor 67 for determination of state of charge and undesirable thermal conditions.

Figure 4:
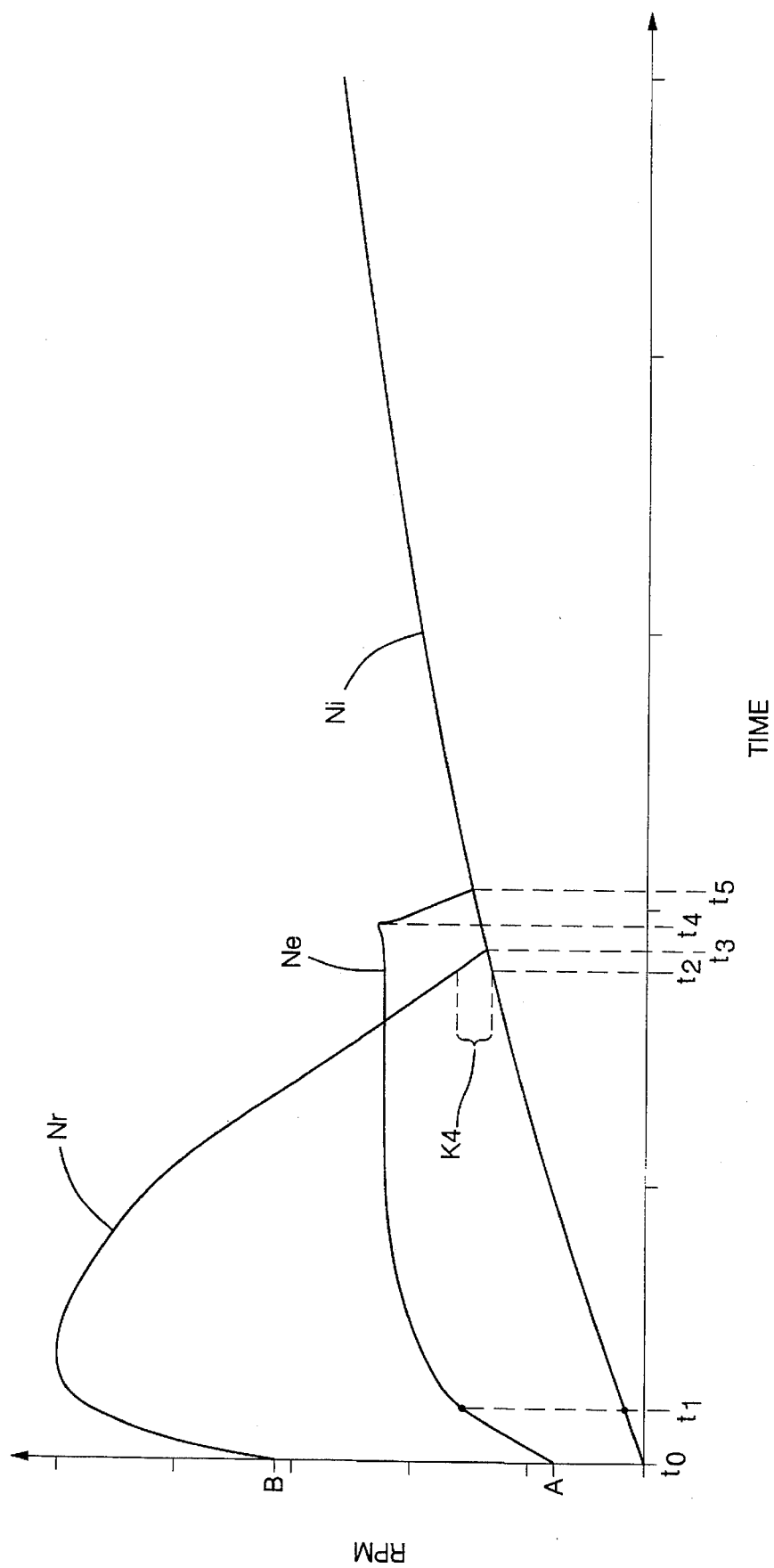

Referring now to FIG. 4, a graphical representation of the rotor speed Nr, engine output speed Ne and transmission input speed Ni illustrates an exemplary regenerative vehicle launch performed in accordance with the control of the present invention. The vertical axis in the figure represents RPM of the various plotted rotational speeds and the horizontal axis in the figure represent time progression relative to a some time $t_0$ whereat the transmission input speed Ni is substantially zero and hence vehicle speed is substantially zero. Changes in the transmission input speed Ni produce proportional changes in transmission output member speed No and, ultimately, vehicle speed Nv. This initial condition of vehicle standstill in effect defines a condition precedent of vehicle launch. It is also noted here that both clutches $C_R$ and $C_E$ are in a fully released state thereby transmitting no torque thereacross either clutch.

Assuming that at times $t_0$– the internal combustion engine is idling at some RPM labeled 'A' and the transmission output member is grounded such as by application of the service brakes or separate grounding clutch (not shown), carrier 23 is grounded through one way device 32, and the electric machine rotational speed labeled B is equivalent to R*A where R is the reactive gear ratio through the gear set 10. As the vehicle idles in this state, it is generally preferable to provide some generator torque in addition to the inertia torque of the rotor to smooth torque perturbations of the internal combustion engine and provide electrical energy for minimizing battery pack draw down or for increasing the battery pack state of charge in dependence upon the magnitude of the vehicle electric loads. Upon initiation of the regenerative vehicle launch, the transmission output member is no longer absolutely grounded by virtue of the service brakes, however, some reaction torque is provided at the transmission input member by the road load and inertia torque of the transmission elements. The vehicle operator steps into the throttle and internal combustion engine speed increases. Internal combustion engine torque is split in accelerating the rotor and the transmission input member as shown between $t_0+$ and $t_1$ of the figure. With the one way device 32 still grounded, the rotor inertia and generator torques provide the reaction torque to the gear set to accelerate the transmission input member and the road load and inertia torque of the transmission provide the reaction torque for acceleration of the rotor.

At a time labeled $t_1$, generator torque is increased as a predetermined function of selected vehicle operating parameters thereby providing an increased controlled reaction torque thereat further impeding its rotation and resulting in increased net torque at the transmission input member. Transmission input member speed Ni continues thereafter to increase while the rotor speed Nr is pulled down by the controlled generator torque load. At a time $t_2$, the speed differential between the rotor and transmission input member has been reduced to a predetermined amount whereat clutch $C_R$ is engaged to couple the transmission input member and rotor. At time $t_3$, such coupling through fully applied clutch $C_R$ is complete and gear set reaction is through carrier 23 and one way device 32 to ground 30. At a time substantially contemporaneous with time $t_2$, the engine speed output member speed Ne is converged with the transmission input member and rotor speeds by application of clutch $C_E$, thereby providing a 1:1 speed coupling between the engine output, transmission input and rotor and completing the vehicle launch.

Figure 2:
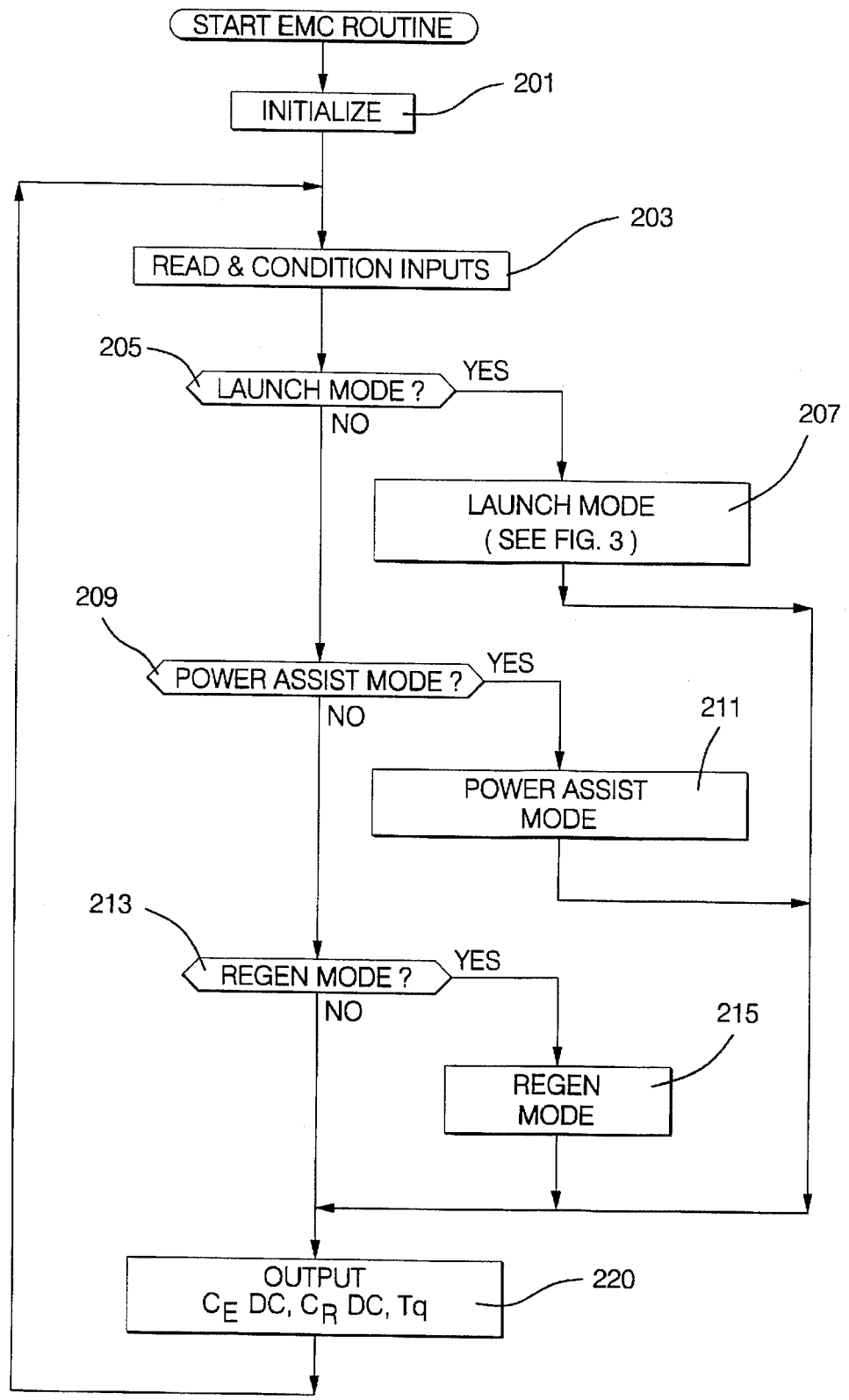
FIGS. 2 and 3 are flow charts representing sets of program instructions repetitively executed by the energy management controller illustrated in FIG. 1 for carrying out the control functions of the present invention; and, FIG. 4 illustrates graphically a vehicle launch performed in accordance with the regenerative operating mode of the electric machine in accordance with the invention.
Figure 3:
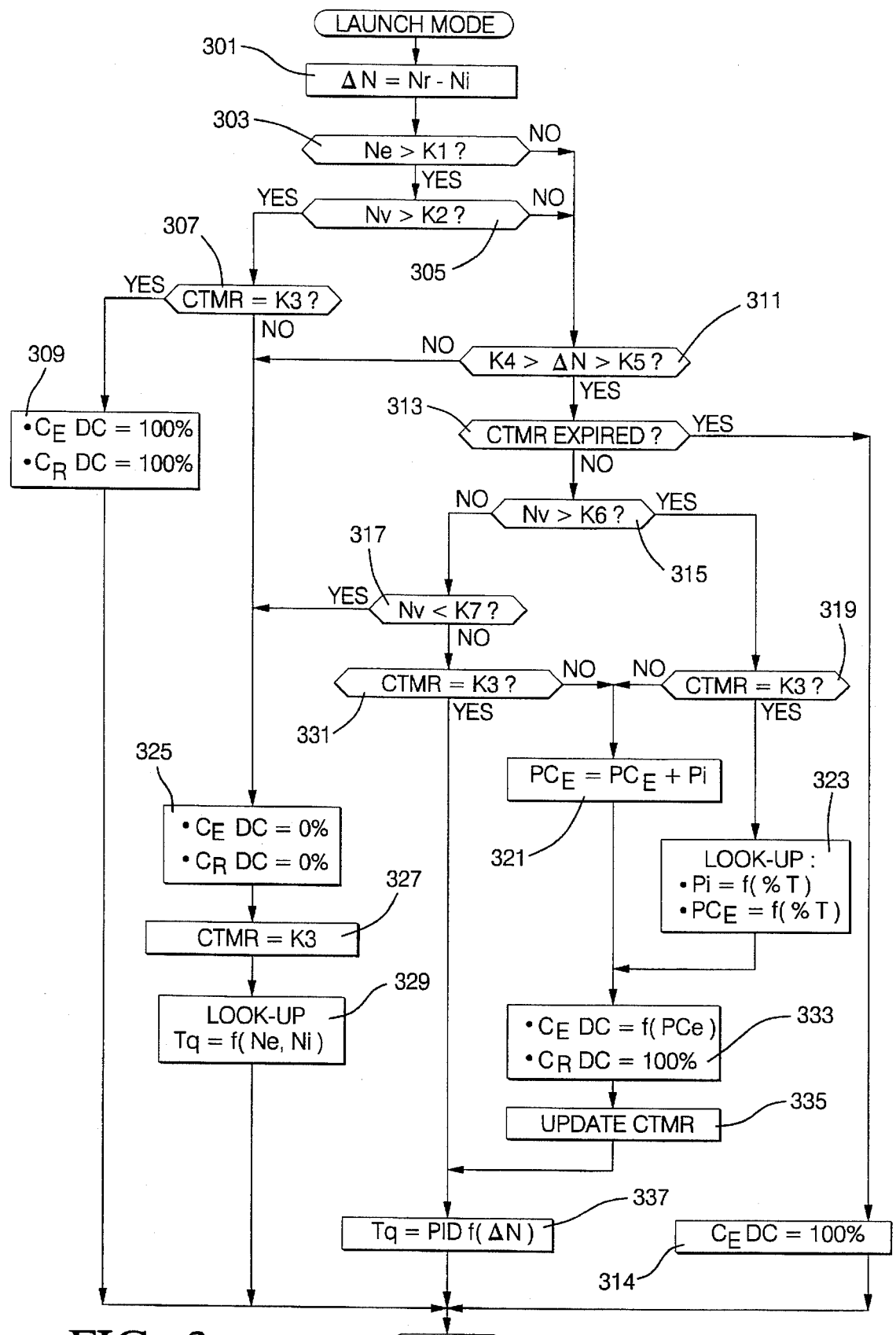

With further reference now to FIGS. 2 and 3, a set of flow charts generally illustrative of program steps executed by the energy management controller 60 illustrated in FIG. 1 are set forth. The flow chart of FIG. 2 represents a set of instructions in a main or executive energy management control loop (EMC ROUTINE) for performing certain repetitive functions including data acquisition and conditioning, system diagnostics and energy management mode selection. The flow chart of FIG. 3 represents a set of instructions in a LAUNCH MODE routine setting forth a preferred embodiment of the regenerative launch control of the present invention.

Beginning with block 201 of the EMC ROUTINE, steps are executed to initialize various counters, flags, registers etc. such as when the vehicle is first powered up. Such initialization steps are thereafter bypassed in the main loop of the EMC ROUTINE. Next encountered is block 203 which represents steps for reading in (and conditioning where necessary) the various data from brake controller, battery monitor, and serial data link used in the energy management control modes. Particularly with respect to the LAUNCH MODE requirements, such data includes: rotor speed, Nr; transmission input speed, Ni; transmission output speed, No; engine output speed, Ne; vehicle speed, Nv and, percent throttle, %T.

Blocks 205, 209 and 213 represent program steps for determination of the particular energy management mode in effect from among modes including a launch mode (block 207), a power assist mode (block 211), and a regenerative mode (block 215). Affirmative answers to predetermined mode specific entry conditions represented by blocks 205, 209 and 213 for the launch, power assist and regenerative modes, respectively, results in the execution of steps associated with the particular mode to be invoked or in effect. The launch mode will be treated in detail with respect to the flow diagram of FIG. 3; however, it suffices for purpose of this disclosure to say that the power assist mode generally invokes control during positive wheel torque application by contributing motoring torque to the engine torque or extracting generator torque therefrom, and regenerative mode generally invokes control during negative wheel torque conditions such as vehicle coast down and service brake application.

Regardless of the particular mode of operation invoked by the control, block 220 represents steps for output of clutch duty cycle signals for the clutch control valves controlling clutches $C_E$ and $C_R$, and the requested torque signal Tq for implementation by the machine controller.

With respect to the launch mode entry conditions, block 205 requires, for example, that vehicle speed Nv be below 1 MPH and throttle position %T be above 2% in the present preferred implementation. If these exemplary conditions are not met, block 205 is answered negatively and blocks 209–215 determine an appropriate energy management mode. Proceeding with the assumption that the conditions are met, block 205 is answered affirmatively and the LAUNCH MODE routine is executed.

With reference now to the LAUNCH MODE routine as detailed in the flow diagram of FIG. 3, block 301 represents the execution of program instructions for calculating the speed differential ΔN between the rotor speed Nr and the transmission input member speed Ni. ΔN will be utilized later in the routine to determine which one of an open loop torque control or closed loop speed control techniques will be implemented.

Blocks 303 through 305 represent engine overspeed protection steps, the objective of which is to bring impending excessive engine speed down. Block 303 performs a check of engine speed against a calibrated threshold value K1 which if exceeded passes processing to the steps of block 305. Block 305 would then check vehicle speed against a calibrated threshold K2 which if exceeded causes execution of the steps represented by block 309. This being the case, full application of both clutches is indicated by setting the respective duty cycle commands $C_EDC$ and $C_RDC$ to 100% at block 309. These events effectively close out the regenerative launch mode.

Were either block 303 or 305 answered in the negative, an engine overspeed condition is not assumed to be impending and block 311 is encountered. The steps represented by block 311 determine whether the speed differential $\Delta N$ between the rotor speed Nr and the transmission input member speed Ni is within a predetermined range such that closed loop speed control may be invoked. For example, if $\Delta N$ is less than 200 rpm and greater than -500 rpm, then closed loop speed control as embodied in blocks 313–337 is invoked. However, if $\Delta N$ is outside of this predetermined range, open loop torque control is executed as embodied in blocks 325–329. Objectively, the closed loop speed control is performed to support the rotor speed while application if the clutch CR is invoked test the rotor speed undershoot the transmission input shaft member speed.

Beginning first with the open loop torque control technique of blocks 325–329, release of both clutches is indicated by setting the respective duty cycle commands $C_EDC$ and $C_RDC$ to 0% at block 325. Block 327 next represents a resetting of the clutch apply timer CTMR to refresh the timer upon any initial invocation, and consequent release of the clutches, of the open loop torque control. Next, block 329 represents instructions executed in the determination of a torque command Tq for the motor. Preferably, as illustrated, these steps carry out a table look-up of torque values in accordance with a predetermined set of independent variables. In the present exemplary embodiment, it is preferred to reference a two-dimensional table by the combination of engine speed Ne and transmission input member speed Ni.

These two parameters are preferred in the control for the following reasons. Changes in torque output of an internal combustion engine significantly lag a torque request when compared to changes in torque output of an electric machine in response to a torque request. Engine speed changes on the other hand occur subsequent to engine torque output changes as a result thereof. Response time of an electric machine is generally significantly faster than that of an internal combustion engine. By choosing engine speed Ne as one of the preferred parameters used to establish the desired motor torque, engine torque and desired motor torque in response thereto are substantially in phase. The transmission input shaft speed Ni is utilized essentially as a high resolution signal of vehicle speed. During vehicle launch when the vehicle speed is relatively low, the high speed ratio through the transmission dictates higher rotational speeds of the transmission input relative to the rotational speeds of the transmission output. Such provides for enhanced resolution preferable for the control of the motor torque. Functionally, therefore, engine speed Ne provides for phased response of motor torque to engine torque and transmission input speed provides for desired convergence of the rotor speed to the transmission input member speed at appropriate vehicle speeds.

The routine then returns to the main loop where the control outputs are generated as shown in block 220.

Assuming now that block 311 recognizes that the speed differential $\Delta N$ is such that closed loop speed control is desired (i.e. between the upper and lower speed differential limits K4 and K5, respectively), the steps of blocks 313–337 are executed to converge the rotor speed Nr and the engine speed Ne to the transmission input member speed Ni.

Beginning with block 313, clutch apply timer CTMR is checked to determine whether it has expired or timed out, thereby indicating the end of the closed loop control and likewise the end of the launch mode. Here, if CTMR has been incremented to a predetermined value K3 then it is deemed expired. Upon determination that CTMR has expired, block 314 executes steps to set the clutch $C_E$ duty cycle to full apply or 100%. Having previously been set to a full apply duty cycle (block 333), clutch $C_R$ is also commanded on fully. Processing returns to the main loop where the control outputs are generated as shown in block 220.

Determination that CTMR has not yet expired passes control to block 315 whereat a vehicle speed Nv is checked against a calibrated upper vehicle speed threshold K6 to determine with certainty whether to application of the clutches $C_E$ and $C_R$ is in order. The upper vehicle speed threshold K6 ensures that the engine speed after application of clutch $C_R$ will remain at or above an acceptable level. Where vehicle speed exceeds the threshold, blocks 319–335 are executed to determine appropriate clutch pressures and duty cycles for achieving same. Block 319 determines from clutch apply timer CTMR if initial values for clutch $C_E$ pressure ($PC_E$) and pressure rate increase (Pi) need be determined. Upon an initial pass, CTMR has not been updated from the initial value of zero so block 323 is executed. Steps at block 323 determine the initial pressure quantities $PC_E$ and Pi preferably as shown as a single dimensional table look-up as a function of the present throttle position (%T). Throttle position is conventionally utilized as a load or torque indicating parameter in the control of automatic transmissions. It is used similarly in the present invention as a measure of engine torque which is to be transferred through the clutch $C_E$. Additionally, and also as a function of %T, expiration value K3 for the clutch apply timer expiration is determined. All determinations in block 323 are provided by way of look-up tables, preferably. $PC_E$ as determined at block 323 is the initial apply pressure for the clutch $C_E$, while Pi is the incremental pressure repetitively added thereto to ramp the net apply pressure upward. Generally, it is preferred that heavier throttle positions have correspondingly higher initial apply pressures $PC_E$ and larger incremental pressures Pi to better match the torque output of the vehicle engine. Also, the expiration value K3 is preferably reduced as %T increases. The shorter apply times (K3) as %T increases comports with the larger incremental pressures Pi as %T increases.

Block 333 would next set the duty cycle of the clutch CE to correspond to the desired pressure $PC_E$ which on the initial pass is the initial pressure determined as a function of %T. From there, CTMR is incremented at block 335.

Referring back to block 319, if CTMR had previously been updated from its initial zero value, then block 321 updates the clutch PCE pressure by summing therewith the predetermined incremental pressure Pi. Blocks 333 and 335 are thereafter executed as previously described.

In the event that block 315 is answered negatively, thus indicating that the upper vehicle speed threshold K6 is not exceeded, a lower vehicle speed threshold K7 is compared to the vehicle speed Nv at block 317. At this point, it is known that the clutch apply timer has not expired (block 313) and vehicle speed does not exceed the upper threshold K6. If the vehicle speed is less than the lower threshold K7, then the closed loop speed control is exited in favor of the open loop torque control (blocks 325–329). The lower vehicle speed threshold K7 enables the release of the clutches thereby allowing the engine speed to increase if necessary to accommodate the conditions which reduced the vehicle speed (e.g. grade load). Further, the difference between the upper and lower vehicle speed thresholds provides for a degree of hysteresis whereby hunting between the closed loop speed control and open loop torque control might otherwise occur.

If block 317 is answered negatively, thus indicating that it is desirable to remain within the closed loop speed control, block 331 checks the clutch apply timer CTMR to determine if the clutches CE and CR are being applied. A non-zero value of CTMR indicates that they are being applied and block 321 is executed to update the pressure of the clutch $PC_E$ as earlier mentioned. From there, blocks 333 and 335 provide the duty cycle values and increment the clutch apply timer CTMR. An un-incremented CTMR determined at block 331 bypasses blocks 321, 333 and 335

Block 337 is executed from one of block 335 or 331 to effectuate the speed control desired. Block 337 represent steps to develop the torque signal Tq intended to converge the rotor speed Nr and transmission input member speed Ni. This is accomplished by conventional proportional/integral/ derivative control tracking a single reference. In this case, the speed error ΔN is used to control the rotor speed Nr to the transmission input member speed Ni.

While the invention has been described in terms of certain preferred embodiments, such are offered as exemplary implementations and shall not be construed as limiting the scope thereof. The embodiments of the invention in which an exclusive property or privilege is claimed are defined as follows:

1. A method of launching a vehicle from a substantially static condition, said vehicle having a drivetrain comprising an internal combustion engine including an engine output member, a electric machine including a stator and rotor, and a gear set operatively coupling said internal combustion engine output, said rotor and a gear set output member of said gear set, said gear set output member being operatively coupled to at least one drive wheel for propelling the vehicle, wherein said generator is effective as an electric brake reaction element to control torque transfer between said engine output member and said gear set output member, the method comprising:

detecting a predetermined set of vehicle drivetrain operating parameters;

controlling a torque influencing electric machine parameter to apply an amount of generator torque to the rotor as a function of said predetermined set of vehicle operating parameters thereby converging respective speeds of the rotor and the gear set output member; and, when the speeds of the rotor and the gear set output member attain a predetermined speed differential relationship, controlling the rotor speed to the gear set output member speed.

2. A method of launching a vehicle from a substantially static condition as set forth in claim 1 wherein said drivetrain further includes a selectably engageable friction device for directly coupling said gear set output member to said rotor, said method further comprising the step of engaging said friction device while controlling the rotor speed to the gear set output member speed.

3. A method of launching a vehicle from a substantially static condition as set forth in claim 1 wherein said drivetrain further includes a selectably engageable friction device for directly coupling said gear set output member to said engine output member, said method further comprising the step of engaging said friction device while controlling the rotor speed to the gear set output member speed.

4. A method of launching a vehicle from a substantially static condition as set forth in claim 1 wherein said predetermined set of vehicle drivetrain operating parameters comprises engine output member speed, rotor speed and gear set output member speed.

5. A method of launching a vehicle from a substantially static condition as set forth in claim 1 wherein said torque influencing electric machine parameter comprises stator current.

6. A method of launching a vehicle from a substantially static condition as set forth in claim 1 wherein said torque influencing generator parameter comprises electric machine slip speed.

7. A method of launching a vehicle from a substantially static condition as set forth in claim 1 wherein said drivetrain further includes a first selectably engageable friction device for directly coupling said gear set output member to said engine output member, and a second selectably engageable friction device for directly coupling said gear set output member to said rotor, said method further comprising the step of engaging said first and second friction devices while controlling the rotor speed to the gear set output member speed.

8. A method of launching a vehicle from a substantially static condition as set forth in claim 7 wherein said step of engaging said first and second friction devices while controlling the rotor speed to the gear set output member speed occurs only above a predetermined vehicle speed.

9. A method of launching a vehicle from a substantially static condition as set forth in claim 7 wherein said step of engaging said first and second friction devices while controlling the rotor speed is effectuated by fully engaging said second friction device and progressively engaging said first friction device from an initial engagement pressure to a final engagement pressure.

10. A method of launching a vehicle from a substantially static condition, said vehicle having a drivetrain comprising an internal combustion engine including an engine output member, a electric machine including a rotor, and a gear set operatively coupling said internal combustion engine output, said rotor and a gear set output member of said gear set, said gear set output member being operatively coupled to at least one drive wheel for propelling the vehicle, a first selectably engageable friction device for directly coupling said gear set output member to said engine output member, and a second selectably engageable friction device for directly coupling said gear set output member to said rotor, wherein said electric machine is effective as an electric brake reaction element to control torque transfer between said engine output member and said gear set output member, the method comprising:

detecting a predetermined set of vehicle drivetrain operating parameters;

controlling a torque influencing electric machine parameter to apply an amount of generator torque to the rotor as a function of said predetermined set of vehicle operating parameters thereby converging respective speeds of the rotor and the gear set output member;

when the speeds of the rotor and the gear set output member attain a predetermined speed differential relationship, controlling the rotor speed to the gear set output member speed;

engaging said first and second friction devices while controlling the rotor speed to the gear set output member speed.

11. A method of launching a vehicle from a substantially static condition as set forth in claim 10 wherein said step of engaging said first and second friction devices while controlling the rotor speed is effectuated by fully engaging said second friction device and progressively engaging said first friction device from an initial engagement pressure to a final engagement pressure, said initial and final engagement pressures being determined as a function of a predetermined measure of engine torque.

12. A method of launching a vehicle from a substantially static condition, said vehicle having a drivetrain comprising an internal combustion engine including an engine output member, a electric machine including a rotor, and a gear set operatively coupling said internal combustion engine output, said rotor and a gear set output member of said gear set, said gear set output member being operatively coupled to at least one drive wheel for propelling the vehicle, a first selectably engageable friction device for directly coupling said gear set output member to said engine output member, and a second selectably engageable friction device for directly coupling said gear set output member to said rotor, wherein said electric machine is effective as an electric brake reaction element to control torque transfer between said engine output member and said gear set output member, the method comprising:

detecting a predetermined set of vehicle drivetrain operating parameters;

performing an open loop control of a torque influencing electric machine parameter to apply an amount of generator torque to the rotor as a function of said predetermined set of vehicle operating parameters thereby converging respective speeds of the rotor and the gear set output member;

when the speeds of the rotor and the gear set output member attain a predetermined speed differential relationship, performing a closed loop control of the rotor speed to the gear set output member speed;

when the vehicle speed exceeds a predetermined threshold, fully engaging said second friction device and progressively engaging said first friction device from an initial engagement pressure to a final engagement pressure, said initial and final engagement pressures being determined as a function of a predetermined measure of engine torque.

* * * * *